United States Patent Office 3,356,326
Patented Dec. 5, 1967

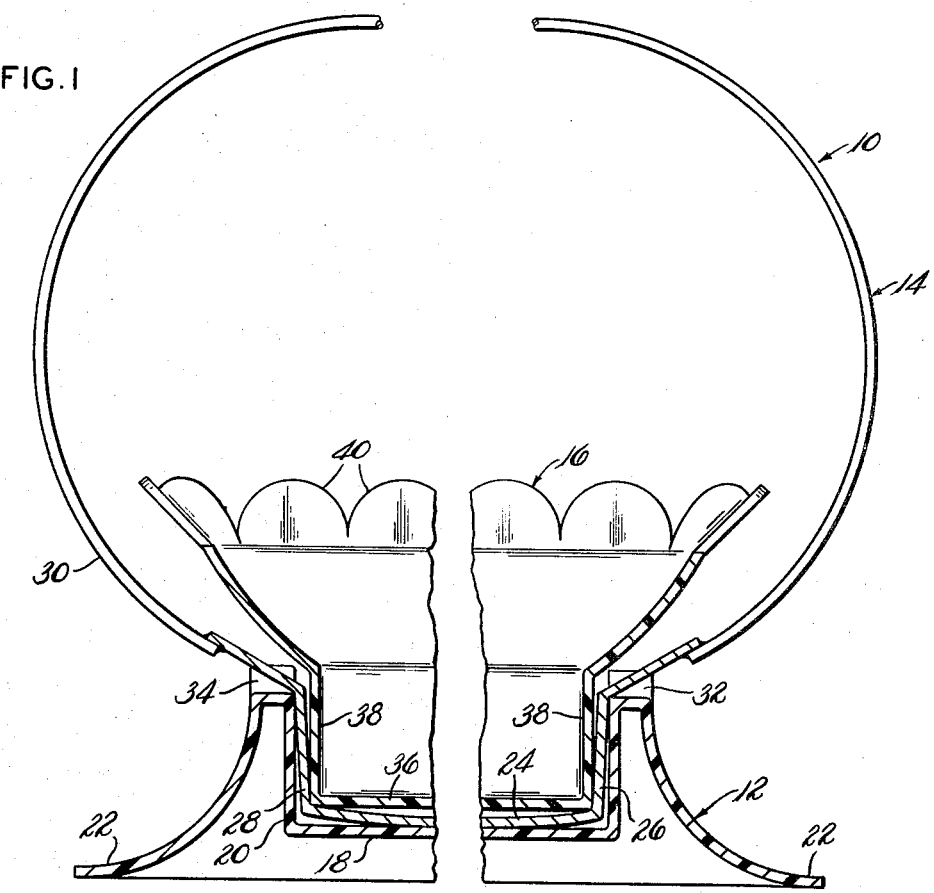
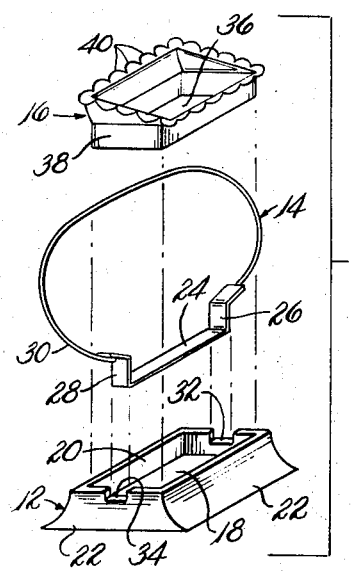
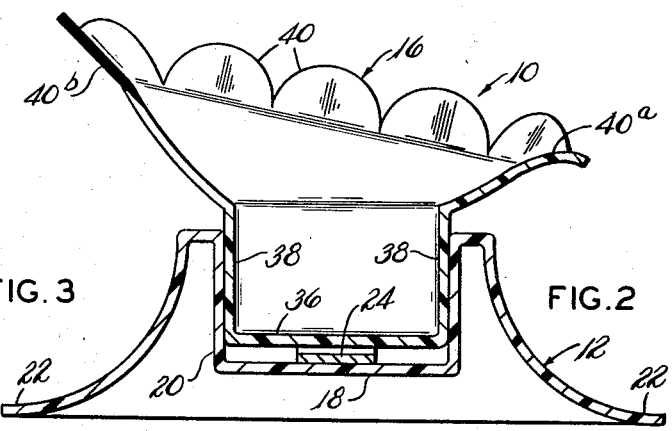

3,356,326
FLOWER BASKET
Henry Muren, Leroy, Ohio (253 16th St. W.,
Barberton, Ohio 44203)
Filed June 7, 1966, Ser. No. 555,797
7 Claims. (Cl. 248—145.6)

ABSTRACT OF THE DISCLOSURE

A pair of basket-like flower holders or the like are provided with one of the pair of holders being adapted to be placed into and nested inside the other holder. Also, a generally ring-shaped handle means is present which has a metal base portion or means adapted for resilient engagement with the inner side walls of one of the holders. The handle means engages between the nested holders and has at least a section overlying a portion of the lower holder to provide lifting means for both of the holders.

---

This invention relates to a new and improved flower basket which is made from three separate units; a base, a handle, and a vase which are adapted to be readily assembled to form a flower basket.

It has been found that flower baskets having a ring-shaped handle provided thereon are very attractive and acceptable for use at funerals, religious ceremonies, and various other appropriate occasions. The ring-shaped handle not only serves as a carrying handle for the floral arrangement but also the smooth symmetrical curve of the handle provides an attractive frame for the floral arrangement. Heretofore these types of flower baskets have been constructed from wicker, wood or papier-mâché, and the flower basket is usually of a one piece construction with the ring-shaped handle portion being integrally connected with or permanently attached to the basket portion of the flower basket. These flower baskets are quite expensive to make, and their large size and one piece construction makes them quite awkward to package and store.

It is the main object of the present invention to provide a flower basket made from a flower vase, a base member, and a handle unit which readily fit together to form a flower basket. Since these three parts forming the flower basket can be readily disassembled as well as assembled, storage and transportation of the flower basket is greatly facilitated. Also the flower basket can be produced quite inexpensively since the three components of the flower basket can be individually manufactured, rather than constructing the flower basket in a one piece unit.

In the drawings, FIG. 1 is a longitudinal vertical section, partially broken away, of a preferred embodiment of the flower basket of the invention;

FIG. 2 is a transverse vertical section of the embodiment illustrated in FIG. 1; and FIG. 3 is an exploded perspective view of the three components which readily assemble together to form the flower basket of the invention.

Referring to the drawings, the flower basket of the invention is generally indicated by the numeral 10. It consists basically of a base or base member 12, a ring-shaped handle means or handle unit 14, and a flower vase 16. These three main components are adapted to be assembled together to form the flower basket of the invention.

Now referring to these components in greater detail, and referring first to the base 12, it is suitably molded from a high strength plastic of any suitable type, such as high impact styrene, and is molded so as to have a centrally located integral basket portion 18. The basket portion 18, as illustrated by FIGS. 1 and 2, is offset and downwardly extending from the base member 12 and sidewalls 20 of the base member 12 effect formation of the basket portion 18. Also leg-like members 22 provided on the lateral margins of the base member 12 provide firm support and balance to the base member as it rests on a horizontal surface. As can be readily visualized the construction of the base member 12 adapts it to receive and firmly support and balance any floral arrangements which are received in the basket portion 18 thereof.

The handle or handle unit 14, as best illustrated by FIGS. 1 and 3, is substantially ring-shaped but does have a flat spring metal strap portion 24 which forms a part thereof. The strap portion 24 has integral upwardly and outwardly directed flanges 26 and 28 formed at the respective ends thereof. A metal circular shaped ring 30 is suitably connected to the respective flanges 26 and 28 to form the handle portion of the handle unit 14.

The strap portion 24 of the handle 14 has a length which is slightly greater than the corresponding longitudinal distance between the end sidewalls 20 of the basket portion 18 so that, as illustrated by FIG. 1, it is difficult to drop the strap portion 24 into the basket portion 18 of the base 12 unless the strap portion 24 is bent slightly prior to it being bottomed therein. This bending of the strap portion 24 is very easy to accomplish by merely grasping the ring 30 with the hands at circumferentially opposed points thereon and then pressing the opposed points of the ring together. This slight bending of the strap portion 24 sufficiently reduces its longitudinal size to permit it to be dropped down into the basket portion 18 of the base 12. As is best illustrated by FIG. 1, the resultant spring action of the strap portion since it has been slightly bent will bias flanges 26 and 28 with the sidewalls 20 of the basket portion 18. This biasing action snugly positions the strap portion 24 into the basket portion 18 of the base member 12. A pair of cutouts 32 and 34 are provided on the end sidewalls 20 of the basket portion of the base member 12, as best illustrated by FIG. 3, and these cutouts seat flanges 26 and 28 when the flat strap portion 24 is positioned in the basket portion 18 of the base member, as illustrated by FIG. 1.

Referring now to the flower vase 16, the base portion 36 thereof formed from sidewalls 38 is of slightly smaller dimensions than basket portion 18 of base member 12. This permits the vase 16 to drop down into and snugly engage with the basket portion 18 of the base member 12, as is best illustrated by FIGS. 1 and 2. The vase 16 has a plurality of ribs or scallops 40 formed around the periphery of the holder and one side 40a of this periphery is usually lower than the other side 40b with this lower side acting as the front of the flower basket assembly. These scallops 40 provide the flower vase 16 with an attractive and pleasing appearance. The vase 16 also is molded from a suitable plastic material which may be of the same type as used to form the base member 12.

FIG. 3 illustrates the base member 12, the handle 14, and the vase 16 in an unassembled position. FIGS. 1 and 2 illustrate the precise way in which first the metal strap 24 is bottomed in a longitudinal direction in the basket portion 18 with the vase 16 then being also dropped therein to form the flower basket assembly of the invention. It should be pointed out that there is no reason why strap portion 24 could not be bottomed in basket portion 18 transversely to base member 12 instead of in a longitudinal direction. It also should be noted that the attractive design of the vase 16 allows it to be used separately with plants or flowers being placed therein. In fact, one of the definite features of the invention is that the florist can arrange a suitable floral display in the vase 16 and transport it to a funeral home, hospital, etc., with the entire flower basket not being assembled until after delivery has been made. In a funeral home, for example, it would be quite possible for the home to be supplied with a number of base members 12 and handle units 14 wherein the florist merely delivers the flower filled vase 16 which the employees of the funeral home then assemble with base member 12 and handle 14 to form the flower basket of the invention.

The basket portion 18 of base member 12 is also adapted to have a floral display or plants fashioned therein, and the base member alone, when flowers are arranged in the basket portion thereof, serves quite acceptably as a table center piece or the like.

It should be understood that any spring action of the handle unit 14 which will cause the flanges 26 and 28 to bias against the end sidewalls 20 of the basket is sufficient to accomplish the objects of the invention. For example, strap portion 24 need not be continuous but can be interrupted whereby ring 30 is grasped and pressed inwardly at circumferentially opposed points until the two flanges 26 and 28 are pressed sufficiently toward each other to permit them to drop down into and nest in the basket portion 18. When the ring 30 is released, flanges 26 and 28 will spring outwardly and bias against the end sidewalls 20 thereby holding the handle unit 14 to the base member 12. In addition, frictional forces retain the strap 24 or equivalent member in engagement with the molded or shaped base 12, while the vase 16 likewise frictionally is pressed into engagement with the base 12 to aid in retaining the handle 14 therein.

The flanges 26 and 28 of the handle means normally seat in the recesses or cutouts 32 and 34 formed in the base 12 on the inner, upper edges of the end sidewalls to aid in retaining the lightweight base 12 and vase 16 and handle in an operative assembly.

While a certain representative embodiment and details have been shown for the purpose of illustrating the invention, it will be apparent to those skilled in this art that various changes and modifications may be made therein without departing from the spirit or scope of the invention.

What is claimed is:
1. In combination,
a base member having a centrally located integral basket portion having end sidewalls,
ring-shaped handle means having a substantially flat spring metal strap portion therein bendable to permit it to snugly engage the basket portion with the spring action of the strap portion and handle means biasing the ends thereof against the end sidewalls of the basket portion, said strap portion having a bottom part that overlies a portion of said base member, and
a flower basket having a base portion adapted to drop down into and snugly engage with the basket portion of said base member and overlie the bottom part of said strap portion whereby both the base member and the flower basket can be lifted by said handle means.

2. A combination as in claim 1 where said ring-shaped handle means includes an arcuate metal member of substantially closed loop form but having two ends, and said metal strap portion comprises two members individually secured to the respective ends of said arcuate metal member and with each of said two members having a said bottom part therein whereby said arcuate metal member will bias said two members into engagement with said base member.

3. The combination according to claim 1 wherein said base member and said flower basket are made from a heat molded thermoplastic material and wherein said handle means are made from a resilient flat metal strap and a substantially circular metal ring connected to the respective ends of said metal strap.

4. The combination according to claim 1 wherein the flat strap portion of said handle means has an integral upwardly and outwardly directed flange on each end of said flat strap portion connected to respective ends of a substantially circular shaped ring forming the handle portion of said handle means.

5. The combination according to claim 4 wherein a pair of recesses provided in the end sidewalls of the basket portion of said base member seat the flanges on the respective ends of said flat strap portion when it is bottomed in the basket portion of said base member.

6. In combination
a pair of basket like flower holders, one of said pair of holders being adapted to be nested inside the other of said pair of holders, and
a split ring shaped handle means having a base portion attached to each end of the handle means and having a lower part shaped to overlie a portion of said holder, the base portions of the handle means being adapted to be resiliently biased into engagement with the sidewalls of one of said holders and to position its said lower part to overlie a portion of such one of said holder before the other of said pair of holders is vested therein whereby both of said holders can be lifted by said handle means.

7. A combination as in claim 6 where one of said flower holders is a base and one is a base means and said base portion of said handle means frictionally engages a center portion of said base and said vase means frictionally is nested within said center portion of said base to aid in forming an operative assembly.

References Cited

UNITED STATES PATENTS

| | | | |
|---|---|---|---|
| 592,556 | 10/1897 | Werner | 47—34 X |
| 1,678,988 | 7/1928 | Maier | 248—145.6 X |

ROY D. FRAZIER, *Primary Examiner.*

F. DOMOTOR, *Assistant Examiner.*

UNITED STATES PATENT OFFICE
CERTIFICATE OF CORRECTION

Patent No. 3,356,326            December 5, 1967

Henry Muren

It is hereby certified that error appears in the above numbered patent requiring correction and that the said Letters Patent should read as corrected below.

Column 4, line 41, for "vested" read -- nested --; line 44, for "base", second occurrence, read -- vase --.

Signed and sealed this 17th day of December 1968.

(SEAL)
Attest:

Edward M. Fletcher, Jr.

Attesting Officer

EDWARD J. BRENNER

Commissioner of Patents